United States Patent
Kobayashi et al.

[11] Patent Number: 5,922,251
[45] Date of Patent: Jul. 13, 1999

[54] METHOD OF MANUFACTURING PLASTIC LENSES

[75] Inventors: Tadashi Kobayashi; Yuyoshi Saito; Shoji Kato, all of Fukui, Japan

[73] Assignee: Asahi Lite Optical Co., Ltd., Fukui, Japan

[21] Appl. No.: 08/765,371

[22] PCT Filed: Apr. 26, 1996

[86] PCT No.: PCT/JP96/01177

§ 371 Date: Jan. 21, 1997

§ 102(e) Date: Jan. 21, 1997

[87] PCT Pub. No.: WO96/33860

PCT Pub. Date: Oct. 31, 1996

[30] Foreign Application Priority Data

Apr. 28, 1995 [JP] Japan .................................. 7-105324

[51] Int. Cl.⁶ .................................................. B29D 11/00
[52] U.S. Cl. .......................... 264/2.1; 264/310; 425/435; 425/808
[58] Field of Search ............................. 264/1.1, 2.1, 310, 264/311; 425/434, 435, 808

[56] References Cited

U.S. PATENT DOCUMENTS

| | | |
|---|---|---|
| 2,429,692 | 10/1947 | Joyce . |
| 4,422,984 | 12/1983 | Neefe ........................................ 264/2.1 |
| 4,424,175 | 1/1984 | Neefe ........................................ 264/2.1 |
| 4,722,813 | 2/1988 | Wichterle et al. ........................ 264/2.1 |
| 5,122,314 | 6/1992 | Bello et al. ............................... 264/2.1 |

FOREIGN PATENT DOCUMENTS

| | | |
|---|---|---|
| 0341747 | 11/1989 | European Pat. Off. . |
| 25 58766 | 8/1985 | France . |
| 57-70617 | 5/1982 | Japan . |
| 2-11309 | 1/1990 | Japan . |

*Primary Examiner*—Mathieu D. Vargot
*Attorney, Agent, or Firm*—Jordan and Hamburg LLP

[57] ABSTRACT

The present invention provides a method of manufacturing plastic lenses of urethane type resin having no or very little optical strain by the casting polymerization method. In the casting polymerization process, polymerization is effected while a suitable motion, for example, a particular rotative motion, or a motion based on rotation with the rotatable shaft disposedhorizontal is imparted to the shell to change the direction of the gravity acting on any minute portion of a monomer injected into the shell.

4 Claims, 3 Drawing Sheets

METHOD OF MANUFACTURING PLASTIC LENSES

TECHNICAL FIELD

The present invention relates to a method of manufacturing optically homogeneous plastic lenses which are suitable for optical uses, such as eye-glass lenses, sunglass lenses, and camera lenses.

BACKGROUND ART

Plastic lenses, as compared with glass lenses, are characterized by being light-weight and hard to break. As a result they have recently been widely used for optical devices and instruments, such as eye-glass lenses and camera lenses. Particularly, plastic lenses for eye-glasses have been rapidly increasing their market share owing to increased refractive index and decreased specific gravity of raw material resins.

As for material resins, diethylene glycol bisaryl carbonate resin has been used for many years. In recent years, urethane type resin has been developed which is obtained by reaction between a polyisocyanate compound and a polyol or polythiol compound.

As for methods of manufacturing polyurethane lenses, there are known those which utilize the reaction between a polyisocyanate compound and a polyol compound proposed in JP-A-57136601, the reaction between a polyisocyanate compound and a polyol compound which contains halogen atoms proposed in JP-A-58164615, the reaction between a polyisocyanate compound and a polyol compound having a diphenylsulfide chain proposed in JP-A-60194401, the reaction between a polyisocyanate compound and a polyol compound which contains sulfur atoms proposed in JP-A-60217229, and the reaction between a polyisocyanate compound and polythiol in which a hydroxyl group in polyol is replaced by a mercapto group proposed in JP-A-60199016, JP-A-62267316, JP-A-63046213, and JP-A-05320301. Production of these polyurethane lenses is usually effected by the casting polymerization method.

Conventionally, in casting polymerization, as shown in FIG. 5, molds 4 and 4-1 and a gasket 5 are used to constitute a lens producing form 8 called a shell. After this form 8 has been clamped by a spring 6, a resin precursor 7, namely a monomer or the like, which is a polymerizable material, is injected into the internal space to initiate polymerization while the shell is kept stationary in the heating furnace.

In the case where plastic lenses are produced by this casting polymerization, there is proposed a method of manufacturing lenses in JP-A-05212732 which comprises the steps of separately mixing polyisocyanate and polyol with various additives to form uniform mixed solutions, separately degassing the solutions, continuously mixing the two solutions together while injecting the mixture into a lens producing form and, allowing it to undergo casting polymerization to produce a foamless, optically superior lens.

Further, when plastic lenses are to be produced by casting polymerization, the polymerization temperature and the duration of polymerization are important. It is stated, for example, in JP-A-05-212732 that the initial temperature is preferably 5–50° C. and it is raised to 100–140° C. in 5–50 hours, and that if the initial temperature is less than 50° C., the polymerization takes a longer time, while if it is higher than 50° C., the resulting lens is liable to be optically inhomogeneous.

Even if the above points are taken into account, however, with the conventional method of manufacturing plastic lenses by casting polymerization requiring the shell to be kept stationary in the heating furnace, the optical strain called stria cannot be completely eliminated, thus, impeding the increase of yield and making cost reduction hard to achieve.

Though the reason why the optical strain occurs in the polymerization process is not clear, it seems that when polymerization proceeds under heat from the outside, a reaction gradually takes place in the monomer in the interior of the molding form and as the monomer polymerizes to become an olygomer, the specific gravity changes. The variation in specific gravity causes the traveling of the monomer and olygomer, and the trail of the travel forms a cause of striae.

Based on the above consideration, we have studied how to prevent the traveling of the monomer and olygomer and have finally developed a method of manufacturing plastic lenses which have no or very little optical strain.

The problems the invention is intended to solve is to prevent the occurrence of optical strain in plastic lenses produced by the casting polymerization method.

DISCLOSURE OF THE INVENTION

According to the invention, a method of manufacturing plastic lenses is characterized in that in the manufacture of plastic lenses by the casting-polymerization method, polymerization is performed while a motion which changes the direction of the gravity acting on any minute portion of a resin precursor serving as a polymerizable material injected into a lens producing molding form (in the present invention, hereinafter referred to as the shell), that is, a motion at relatively low speed not causing the monomer in the interior to be subjected to centrifugal force or inertial force, is imparted to the shell.

The resin precursor mentioned above is a material put into cast polymerization, and it is mainly a monomer, but sometimes it may be an olygomer. In the present invention, it will hereinafter be described simply as a monomer.

In the above, the motion to be imparted to the shell during the casting polymerization process may be any movement so long as it will continuously gradually change the direction of the gravity acting on any minute portion of the monomer in the interior; however, a rotative motion is preferable from the viewpoint of the ease to control. Particularly, a rotative motion in a particular direction in which the rotatable shaft of the shell is substantially horizontal.

That is, although the rotatable shaft of said shell may be inclined with respect to the horizontal, this is not preferable since the greater the angle of inclination, the less the change in the direction of the gravity acting on the monomer.

Further, in the method of manufacture using casting polymerization, it is particularly effective to perform polymerization while causing the shell having a monomer injected thereinto to make a rotative travel along the substantially horizontal rotatable shaft.

The rotative motion in the particular direction to be imparted to the shell in the casting polymerization process is as follows.

A monomer solution prepared by a predetermined method is injected into the shell, a plug is applied to the injection port to prevent leakage of the monomer, whereupon the shell is caused to make a rotative motion in the vertical direction. The rotative motion in the vertical direction is meant to cause the shell having the monomer injected therein to rotate around a substantially horizontal shaft or to make a rotative travel (rolling) therearound.

It is recommended that the rotative speed (the number of revolutions) of the shell be within a relatively low speed range, or 0.1–60 rpm, preferably 0.5–40 rpm. That is, if the speed is higher than in this range, the centrifugal force influences the monomer in the interior, while if it is lower than in this range, the change of the direction of the gravity acting on the monomer in the interior is slowed. This means that out of said range, it is impossible to achieve the object of remedying the optical strain.

In addition, it is to be understood that the rotative motion includes a repetitive rotation or rotative travel in opposite directions, in addition to a rotation or rotative travel of the shell in one direction.

Further, while the present invention is suitably utilized particularly for the manufacture of lenses of a polyurethane type resin, it is also applicable to other resin types used for optical lenses, for example, acrylic and CR-39.

Said casting polymerization involves charging unifunctional or polyfunctional monomers singly or in a mixture into a lens producing shell which is a combination of molds and a gasket, and curing by heat and light to mold it into a form of shell.

As for polyisocyanate compounds used as monomers to produce polyurethane lenses, though not particularly limited, mention may be made of toluylene diisocyanate, xylene diisocyanate, diphenyl methane duiisocyanate, hexamethylene diisocyanate, isophorone diisocyanate, hydrogenated-xylene diisocyanate, hydrogenated-diphenylmethane diisocyanate, tetramethyl xylene diisocyanate, bis (isocyanate methyl) disulfide, 2,5-bicyclo [2,2,1]heptane bis (methyl isocyanato), 2,6-bicyclo[2,2,1] heptane bis (methyl isocyanato).

Polyols which are used in the present invention for reaction with polyisocyanate to produce polyurethane lenses are not particularly limited. For example, mention may be made of ethylene glycol, diethylene glycol, propylene glycol, glycerol, pentane diol, and hexane triol. Sulfur-ion-containing compounds of the type in which part or all of the hydroxyl groups of these polyols are replaced by mercapto groups, such as tetrakis (mercapto methyl) methane, pentaerythritol tetrakis (3-mercaptopropionate), 1,2-bis [(2-mercaptoethyl) thio]-3-mercaptopropane, and 4-mercaplomethyl-3,6-dithio-1,8-octanedithiol, are preferably used from the viewpoint of the refractive index of lens-use resins.

As for the mixing proportions of polyisocyanate compound and polyol compound, the NCO/OH or SH (functional group) molar ratio is usually within the range of 0.5–3.0, and preferably 0.5–1.5.

Further, according to the object, various additives may be added. For example, internal release agents, crosslinking agents, ultraviolet absorbers, light stabilizers, antioxidants, pigments, and perfumes can be added.

As for lens producing shells (molding forms) by casting polymerization, use is made of a combination of glass, metal or ceramic molds, and a gasket of resin, such as ethylene vinyl acetate copolymer (EVA), ethylene ethyl vinyl acetate copolymer (EEA) or polyethylne (PE). In the case of polyurethane lenses, casting polymerization is effected by injecting a mixture of a polyisocyanate compound and a polyol compound into the void of this shell. The gasket may be replaced by an adhesive tape or seal tape of PE, polyethylene terephthalate (PET) or polytetrafluoroethylene (PTFE).

The polymerization is performed usually by gradually elevating the temperature from low to high. At this time, it is preferable from the viewpoint of improving the homogeneity of the lens that the initial temperature be 5–50° C. and be raised to 100–140° C. in 5–50 hours. Further, in order to regulate the reaction rate, a known reaction catalyst, which is used in a urethane forming reaction, may be added.

In the method of the present invention, a motion such as rotation is imparted to the shell to continuously gradually change the direction of the gravity acting on any minute portion of the monomer in the interior, thereby making it possible to substantially prevent the travel of the injected monomer;-thus, a plastic lens which has no or very little optical strain can be obtained. Particularly, by setting the temperature and rotative speed under proper conditions, plastic lenses having no optical strain can be obtained.

Further, in the method now in use, which involves keeping the shell stationary, clouds sometimes form in the produced lens interior owing to the reaction between a gasket and a monomer. According to the present invention, since polymerization proceeds while preventing the travel of the monomer in the shell interior, the cloud entering the lens interior is prevented in that such cloud stops spreading at the peripheral portion.

DETAIL DESCRIPTION AND BEST MODE OF THE INVENTION

The present invention will now be described in more detail with reference to its embodiments and comparative examples, but the invention is not limited thereto.

The method of preparing monomer solutions and the method of examining striae in embodiments and comparative examples were as follows.

METHOD OF PREPARING MONOMER SOLUTIONS 15 kg of MR-6A Solution produced by Mitsui Toatu Kagaku was charged into a 40 l tank (DV-40-JA MODEL, produced by Advantec) and subjected to 5 hours of defoaming under reduced pressure. Subsequently, 19.5 kg of MR-6B Solution was charged and defoaming was continued under cooled (10° C.) stirring. This was followed by 3 hours of cooling, stirring and defoaming with the addition of dibutyl tin dichloride serving as a catalyst, whereby a monomer solution was prepared.

METHOD OF EXAMINING STRIAE

A lens was held in the path of parallel light rays from a 100 W superhigh pressure mercury lamp radiating device (U1-100 MODEL, produced by Ushio Electric) and the image of the lens projected on a white screen was examined. Lenses having striae gave a projected image having a shade, on the basis of which shape they were judged to be defective.

(Embodiment 1)

Figure 1:
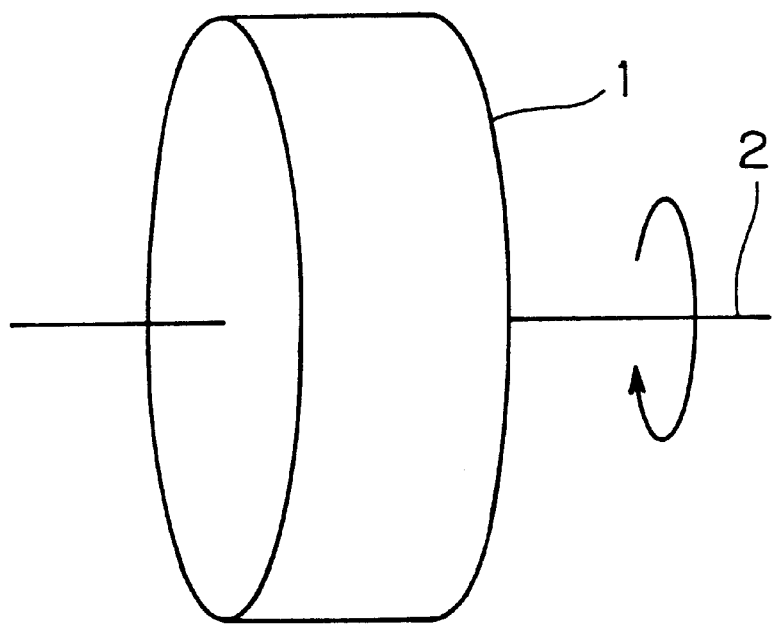
FIG. 1 is an explanatory view showing the position of a rotatable shaft and its direction of rotation concerning embodiments 1, 2 and 4 of the present invention and comparative example 3.

FIG. 1 is an explanatory view of this embodiment, wherein the numeral 1 denotes a shell serving as a lens producing molding form and 2 denotes a rotatable shaft. A monomer solution obtained by the predetermined preparing method described above was injected into the shell which was comprised of two glass molds and a gasket as in the prior art, and after a plug was applied to the injection port to prevent leakage of the monomer, the shell was then mounted on a rotating device having a substantially horizontal rotatable shaft so that the rotatable shaft extended substantially perpendicularly through substantially the centers of the glass mold surfaces and the shell was tied so that the rotation did not cause it to fall off. Thus, rotation was continued at 1 rpm at a polymerization temperature of 40° C. for 10 hours, effecting polymerization. Thereafter, the rotation was stopped and the temperature was raised to 120° C. to cure the monomer. Thus, the gasket and the glass molds were removed and a solid lens of polymer was obtained. The lens obtained was tested for striae and the result is shown in Table 1.

(Embodiment 2)

As in the embodiment 1 and as shown in the explanatory view of FIG. 1, a shell 1 having a monomer solution injected thereinto was mounted on the rotating device having the horizontal rotatable shaft 2. In performing casting polymerization, rotation was continued at 25 rpm at a polymerization temperature of 20° C. for 42 hours, the rest of the operation being exactly the same as in the embodiment 1 and a solid lens was obtained. This lens was tested for striae and the result is shown in Table 1.

(Embodiment 3)

Figure 2:
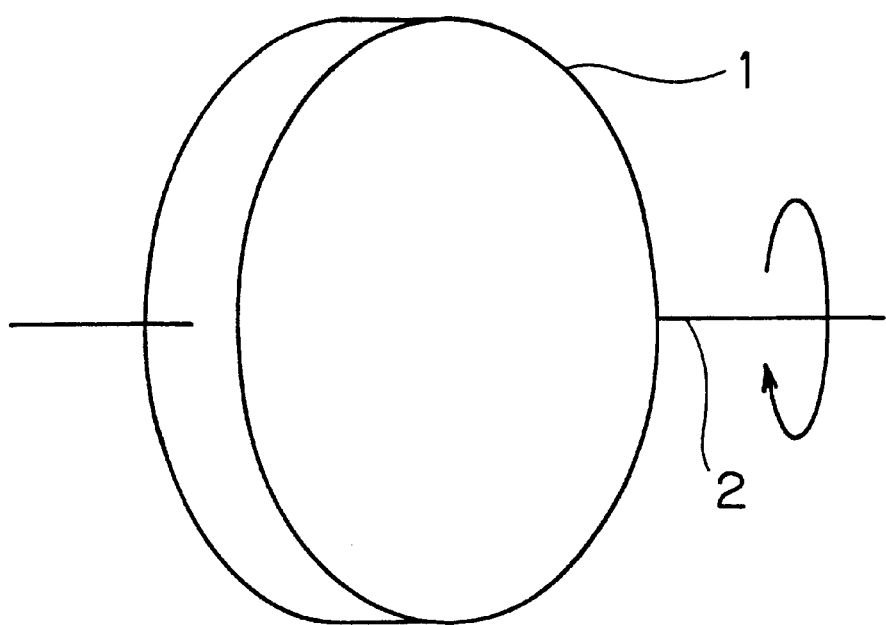
FIG. 2 is an explanatory view showing the position of a rotatable shaft and its direction of rotation concerning embodiment 3 of the present invention.

FIG. 2 is an explanatory view of this embodiment, wherein the numeral 1 denotes a shell serving as a lens producing molding form, and 2 denotes a rotatable shaft. A monomer solution obtained by the predetermined preparing method described above was injected into a shell which was comprised of two glass molds and a gasket as in the prior art, and after a plug was applied to the injection port to prevent leakage of the monomer, the shell was mounted on a rotating device having a substantially horizontal rotatable shaft so that the rotatable shaft extended through substantially the center of the shell and substantially in parallel with the glass mold surfaces, and the shell was tied so that the rotation did not cause it to fall off. And rotation was continued at 10 rpm at a polymerization temperature of 20° C. for 42 hours, effecting polymerization. Thereafter, the rotation was stopped and the temperature was raised to 120° C. to cure the monomer. Thus, the gasket and the glass molds were removed and a solid lens was obtained. This lens was tested for striae and the result is shown in Table 1.

(Embodiment 4)

As in embodiment 1 and as shown in the explanatory view of FIG. 1, a shell 1 having a monomer solution injected therein was mounted on the rotating device having the horizontal rotatable shaft 2. In performing cast polymerization, rotation was continued at 25 rpm at a polymerization temperature of 35° C. for 12 hours, the rest of the operation being exactly the same as in the embodiment 1 and a solid lens was obtained. This lens was tested for striae and the result is shown in Table 1.

(Embodiment 5)

Figure 3:
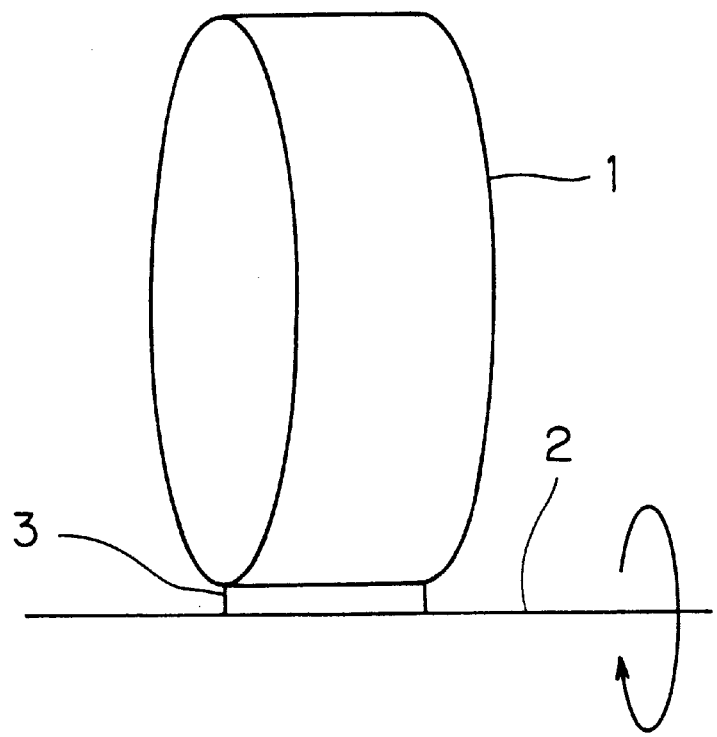
FIG. 3 is an explanatory view showing the position of a rotatable shaft and its direction of rotation concerning embodiment 5 of the present invention.

FIG. 3 is an explanatory view of this embodiment, wherein the numeral 1 denotes a shell serving as a lens producing molding form; 2 denotes a rotatable shaft; and 3 denotes a jig for connecting the shell and the rotatable shaft. A monomer solution obtained by the predetermined preparing method described above was injected into the shell which was comprised of two glass molds and a gasket, and after a plug was applied to the injection port to prevent leakage of the monomer, the shell was mounted on the rotating device having the substantially horizontal rotatable shaft so that the rotatable shaft extended perpendicularly to the glass mold surfaces and outside the shell and the shell was tied so that the rotation did not cause it to fall off. And rotation was continued 1 rpm at a polymerization temperature of 30° C. for 16 hours. The rotation was not stopped thereafter and the temperature was raised to 120° C. to cure the monomer. The gasket and the glass molds were removed and a solid lens was obtained. This lens was tested for striae and the result is shown in Table 1.

(Comparative example 1)

A monomer solution obtained by the predetermined preparing method described above was injected into a shell which was comprised of two glass molds and a gasket, and after a plug was applied to the injection port to prevent leakage of the monomer, polymerization was effected, without rotation, at a polymerization temperature of 30° C. for 16 hours. Thereafter, the temperature was raised to 120° C. to cure the monomer. The gasket and the glass molds were removed and a solid lens was obtained. The lens obtained was tested for striae and the result is shown in Table 1.

(Comparative example 2)

Figure 4:
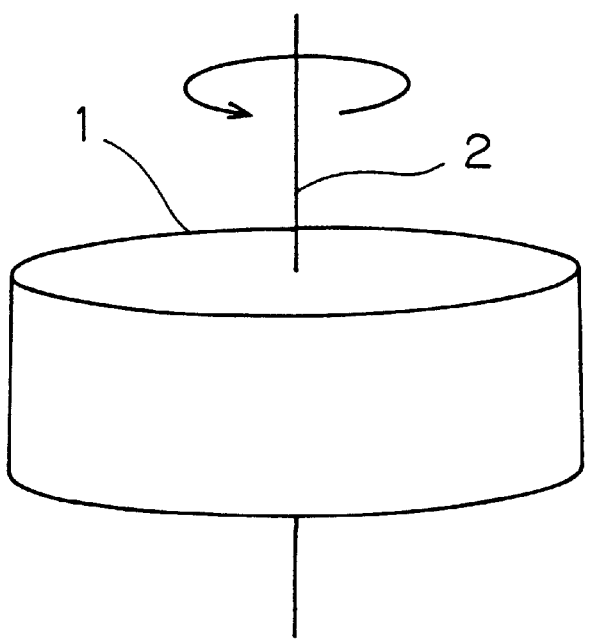
FIG. 4 is an explanatory view showing the position of a rotatable shaft and its direction of rotation concerning comparative example 2 in the present invention.
Figure 5:
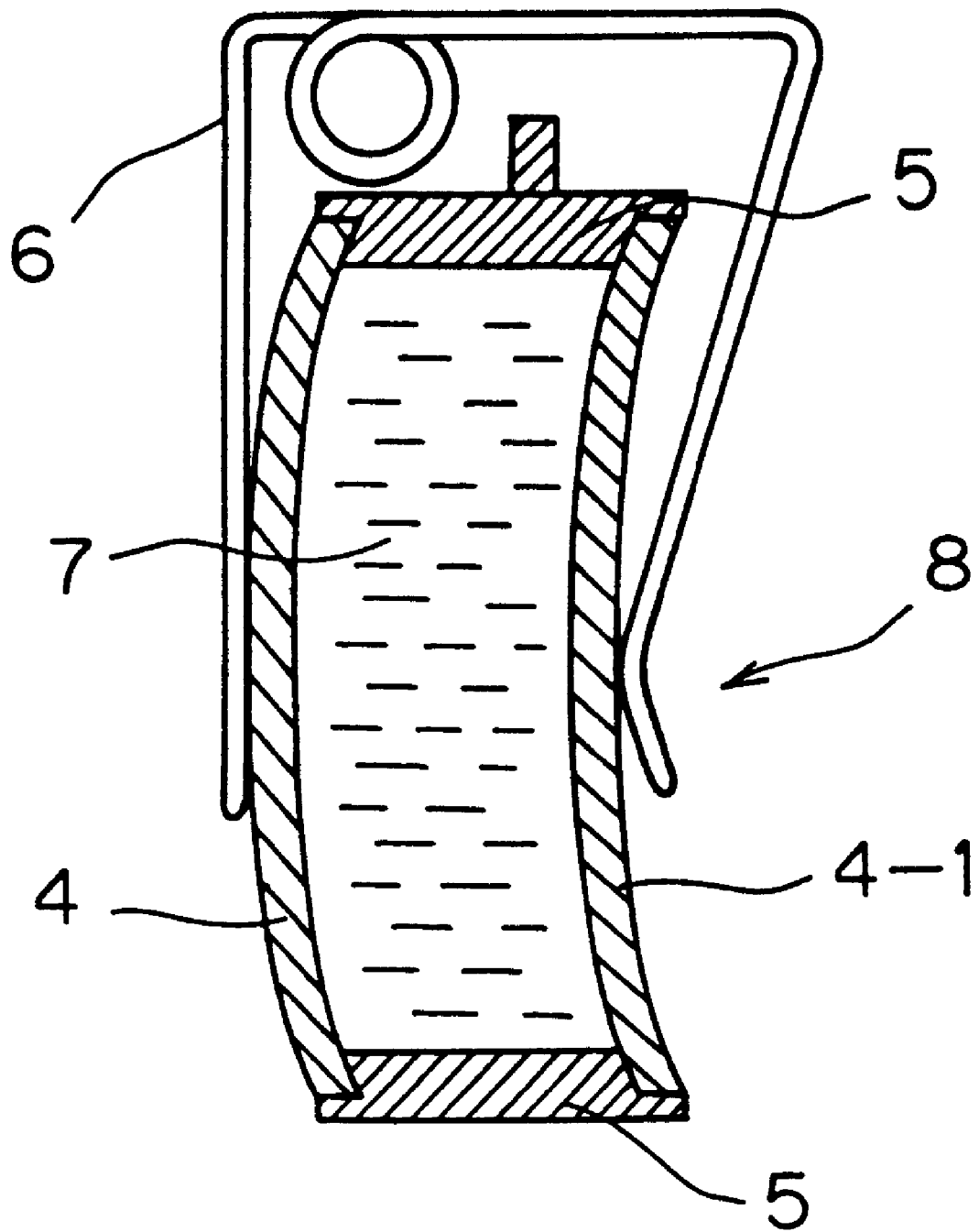
FIG. 5 is a sectional view showing the construction of a molding form for lens production using a conventional method.

FIG. 4 is an explanatory view of this comparative example, wherein the numeral 1 denotes a shell serving as a lens producing molding form, and 2 denotes a rotatable shaft. A monomer solution obtained by the predetermined preparing method described above was injected into the shell which was comprised of two glass molds and a gasket, and after a plug was applied to the injection port to prevent leakage of the monomer, the shell was mounted on the rotating device having the substantially vertical rotatable shaft so that the rotatable shaft extended vertically through substantially the centers of the glass mold surfaces and the shell was tied so that the rotation did not cause it to fall off. Rotation was continued at 10 rpm at a polymerization temperature of 20° C. for 42 hours, effecting polymerization. Thereafter, the rotation was stopped and the temperature was raised to 120° C. to cure the monomer. The gasket and the glass molds were removed and a solid lens was obtained. This lens was tested for striae and the result is shown in Table 1.

(Comparative example 3)

As in embodiment 1 and as shown in the explanatory view of FIG. 1, a shell 1 having a monomer solution injected therein was mounted on the rotating device having the horizontal rotatable shaft 2. In performing casting polymerization, rotation was continued at 100 rpm at a polymerization temperature of 20° C. for 42 hours, the rest of the operation being exactly the same as in embodiment 1, and a solid lens was obtained. This lens was tested for striae and the result is shown in Table 1.

TABLE 1

|  | Conditions for rotation Number of revolutions | Conditions for polymerization | | Effect Number of deficient articles with striae/Actual number |
|---|---|---|---|---|
|  |  | Polymerization temp. (°C.) | Polymerization time (Hr.) |  |
| Embodiment 1 | 1 | 40 | 10 | 0/220 |
| Embodiment 2 | 25 | 20 | 42 | 0/20 |

TABLE 1-continued

| | Conditions for rotation Number of revolutions | Conditions for polymerization | | Effect Number of deficient articles with striae/Actual number |
| --- | --- | --- | --- | --- |
| | | Polymerization temp. (°C.) | Polymerization time (Hr.) | |
| Embodiment 3 | 10 | 20 | 42 | 0/480 |
| Embodiment 4 | 25 | 30 | 12 | 3/20 |
| Embodiment 5 | 1 | 30 | 16 | 0/4 |
| Comparative example 1 | 0 | 30 | 16 | 120/120 |
| Comparative example 2 | 10 | 20 | 42 | 8/8 |
| Comparative example 3 | 100 | 20 | 42 | 4/4 |

Whereas the experiments have been made on the basis of the aforesaid hypothesis, as can be seen from Table 1, it has been found that a particular motion, mainly a particular rotative motion imparted to the shell to continuously gradually change the direction of the gravity acting on minute portions of the monomer (embodiments 1–5) is effective to remedy striae and that deficiency by striae can be remarkably remedied by satisfying the various conditions which, besides the polymerization temperature, include the position and direction of the rotatable shaft or rotative speed when the shell is rotated.

INDUSTRIAL APPLICABILITY

According to the plastic lens manufacturing method of the present invention described so far, it is possible to solve the problem of striae in the conventional plastic lens manufacturing method and to shorten the polymerization time, which, in turn, makes it possible to decrease the stock of molds, to improve yield and to reduce the production cost.

Furthermore, the plastic lens obtained by the present invention is an optically homogeneous lens without optical strain or a lens having no cloud in the interior, which can be suitably utilized for various optical purposes, such as and eye-glass lens, sunglass lens and camera lens.

What is claimed is:

1. A method of manufacturing plastic lenses for performing casting polymerization using a lens molding form, comprising injecting a resin precursor of a polymerizing material into the molding form and heating to polymerize the injected resin precursor, and rotating the mold during the polymerization about a substantially horizontal axis at a rotational speed effecting substantially no influence of centrifugal force on the resin precursor, whereby the direction of gravity acting on any minute portion of the resin precursor is changed during the rotation.

2. A method of manufacturing plastic lenses as set forth in claim 9, wherein the molding form has a disk configuration having one of a disk axis substantially parallel to the substantially horizontal axis and a disk plane substantially perpendicular to the substantially horizontal axis.

3. A method of manufacturing plastic lenses as set forth in claim 1, wherein the rotative speed of the molding form is within the range of 0.1–60 rpm.

4. A method of manufacturing plastic lenses as set forth in any one of claims 1, 2 or 3, wherein a polyurethane resin precursor is injected into the molding form.

* * * * *